United States Patent [19]

Beauviala

[11] Patent Number: 4,832,481
[45] Date of Patent: May 23, 1989

[54] PROCESS AND APPARATUS FOR TRANSFERRING IN SYNCHRONISM, ONTO COMMON RECORDING SUPPORT, THE IMAGES OF A CINETOGRAPHIC FILM AND THE SOUND RECORDED

[76] Inventor: Jean-Pierre Beauviala, 3, rue Hache, 38000- Grenoble, France

[21] Appl. No.: 192,375

[22] Filed: May 10, 1988

[30] Foreign Application Priority Data

May 12, 1987 [FR] France ................. 87 06652

[51] Int. Cl.$^4$ ............................. G03B 31/04
[52] U.S. Cl. ....................... 352/5; 352/12; 352/25; 352/31; 352/129
[58] Field of Search .......... 352/5, 12, 25, 31, 129

[56] References Cited

U.S. PATENT DOCUMENTS

| | | | |
|---|---|---|---|
| 3,743,391 | 7/1973 | White | 352/5 |
| 3,926,511 | 12/1975 | Gendrot et al. | 352/5 |
| 3,995,946 | 12/1976 | Greenberg | 352/5 |
| 3,999,842 | 12/1976 | Niederhauser et al. | 352/5 |

FOREIGN PATENT DOCUMENTS

2435071  3/1980  France .

OTHER PUBLICATIONS

Fernseh—und Kinotechnik, vol. 37, No. 12, Dec. 1983, pp. 499–502, Berlin, DE, W.-R. Otto: "Fortschrittliche Video–Tonnachbearbeitung", p. 501, left col.
S.M.P.T.E. Journal, vol. 95, No. 7, Jul. 1986, pp. 727–732, White Plains, New York, U.S.A., D. M. James Compton et al., "Implementation of Time Code Using Datakode Magnetic Control Surface Film", p. 730.

Primary Examiner—Monroe H. Hayes

[57] ABSTRACT

An apparatus for transferring in synchronism, onto a common recording support, the images of an cinematographic film and the sound recorded during shooting on a separate support, comprises a telecine apparatus ensuring reading of the cine film. A microcomputer has an input connected to a reader of time codes borne by the cine film. A first output of the microcomputer is connected to a stage controlling the supply of an electric motor ensuring advance of the cine film in the telecine apparatus. A second output of the microcomputer is connected to a coder and a third output is connected to a first input of a comparator with two inputs of which the second input is connected to the head for reading the time codes on the magnetic tape, the output of the comparator is connected to a stage controlling supply of an electric motor of the servo-controlled magnetic tape recorder and the third output of the microcomputer is also connected to a device for recording time codes on the third track of the video tape.

2 Claims, 2 Drawing Sheets

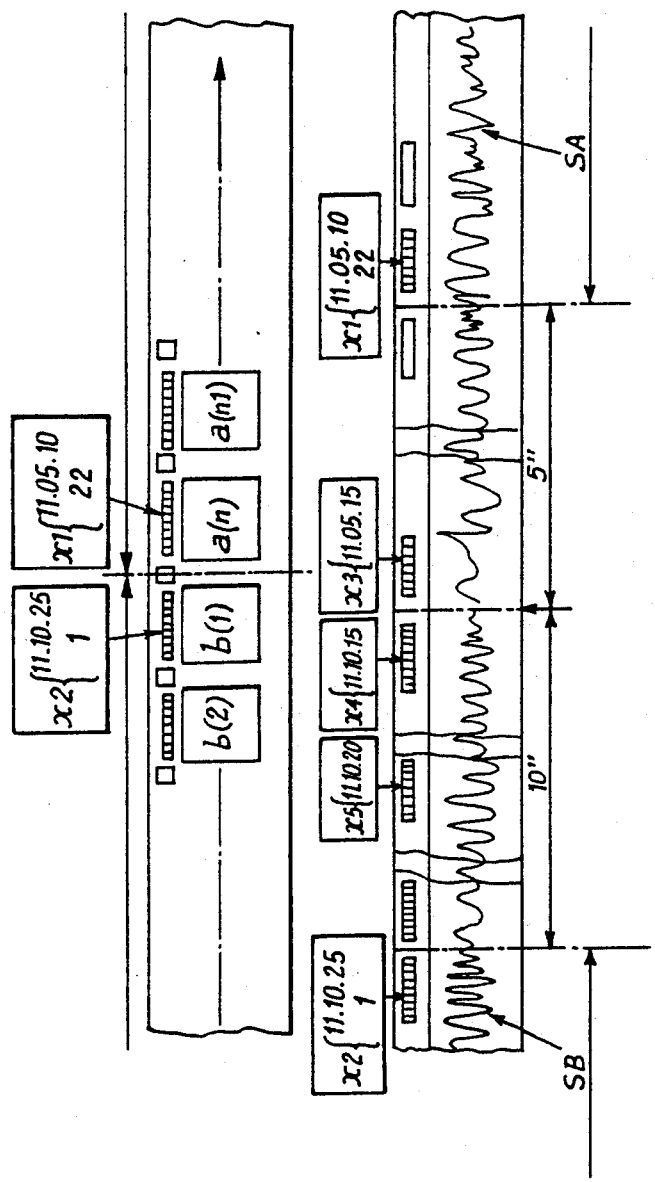
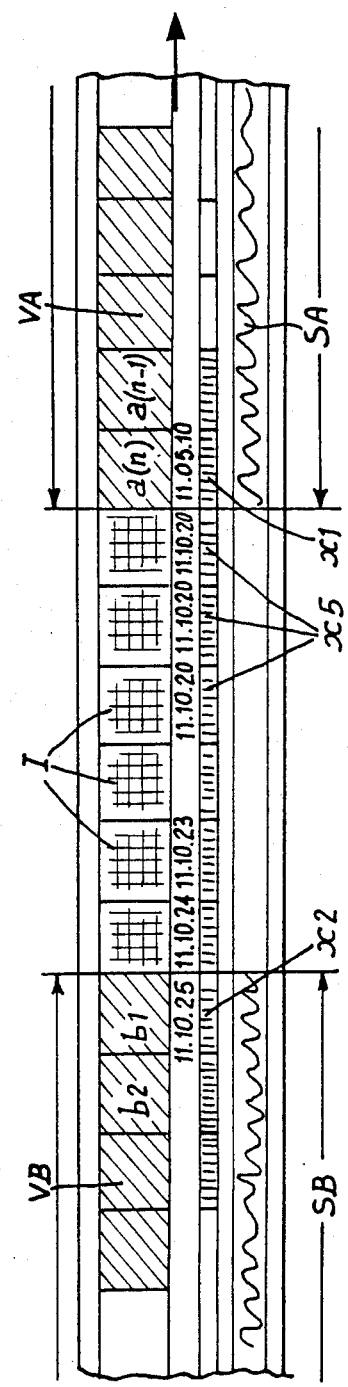
Fig. 2

PROCESS AND APPARATUS FOR TRANSFERRING IN SYNCHRONISM, ONTO COMMON RECORDING SUPPORT, THE IMAGES OF A CINETOGRAPHIC FILM AND THE SOUND RECORDED

BACKGROUND OF THE INVENTION

The present invention relates to a process and an apparatus for transferring in synchronism onto a common recording support, the images of a cinematographic film and the sound recorded during shooting on a separate support.

When shooting a cinematographic sound film, the operator manoeuvring the camera records on the cine film successive shots each constituted by a succession of images recorded on the film and corresponding to an interesting sequence. At the same time, the sound is recorded on a separate support such as a magnetic tape, the sound recording being effected in synchronism with the shooting.

To allow a subsequent operation of transfer onto a common support, such as a video tape, information, in code and/or clear, indicating in particular the date and time at which each recording was made, is recorded during each shooting, both on the cine film and on the magnetic tape for recording the sound. In other words, with each image of the cine film is associated information recorded on the film next to the image and which indicates the date and time of day at which the image in question was taken. At the same time, the magnetic tape for recording sound also bears a succession of codes indicating respectively the date and the various moments of that day when sound recordings were made. It is thus possible subsequently to transfer, onto a common recording support, such as a video tape, both the images of the cine film and the recordings of the sound tape corresponding to these images, and this in synchronism.

Up to the present time, this transfer has been effected manually and when stopped, i.e. the film editor must, in that case, position the film and the sound tape with respect to each other, using a point of synchronism recognizable both on the film and the sound tape, generally the clapboard marking the beginning of each shooting sequence. However, such a process of transfer presents a difficulty in that the sound tape is started by the sound engineer a certain time before the operator starts the cine camera himself, for recording a shooting sequence. Furthermore, the advance of the sound tape also continues a certain time after the operator has stopped the cine camera. It is therefore necessary, during subsequent transfer onto a common recording support to be able to "set" in synchronism and with precision the shooting sequences recorded on the cine film, on the one hand, and the sound sequences corresponding thereto, on the other hand.

SUMMARY OF THE INVENTION

It is an object of the present invention to obtain such strict synchronism by very simple means, automatically and sufficiently rapidly in order not to have to stop the advance of the video tape.

To that end, this process of transfer in synchronism, onto a common recording support, of the images of a cinematographic film and of the sound recorded during shooting on a separate support, with a recording in synchronism respectively on the cine film and the sound recording support, of time code indicating periodically the effective time at which the film was shot, in which there are recorded on a first track of the common recording support successive video signals corresponding to the successive shots; on a second track of the common recording support, successive sound sequences corresponding to these shots and, on a third track, time codes, is characterized in that there is detected on the cine film every discontinuity between a first time code corresponding to the end of a first shot and a second time code corresponding to the beginning of a second shot recorded on the film immediately after the preceding one; following such detection, this cine film is returned rearwardly and stopped in the position corresponding to the separation between the two successive shots; a third time code corresponding to a fictitious time prior to the time of the beginning of the second shot is simultaneously calculated from the second time code; this third time code is repeatedly recorded on the third track of the common recording support following the first time code corresponding to the end of the first shot and immediately after the moment when the cine film has been stopped, time codes incremented regularly from the value of the third time code are then recorded; a succession of signals corresponding to identical images such as a striated pattern, is recorded on the common recording support during the period of time during which the cine film returns rearwardly and is maintained stopped, and during this period of time, the sound recording support is set in position and speed, on the fictitious time defined by the third time code, and the cine film is restarted upon detection of the second time code so that the sound recording support is then in perfect synchronism with the film having just started.

The invention also relates to an apparatus for transferring in synchronism, onto a common recording support, the images of a cinematographic film and the sound recorded during shooting on a separate support, comprising a telecine apparatus ensuring reading of the cine film, this apparatus comprising an image reader and a reader of time codes indicating the shooting times, a servo-controlled magnetic tape recorder for reading a magnetic tape for sound recording, which comprises a reading head for reading the sound sequences, and another reading head for reading the time codes recorded on the magnetic tape and defining the times of the sound recordings, the image reader being connected to a coder itself connected to a device for recording video signals which are recorded on the common support constituted for example by a magnetic video tape, and which correspond respectively to the shots, the sound reading head itself being connected to a device for recording the successive sound sequences on the video tape in synchronism with the video sequences, characterized in that it comprises a microcomputer comprising an input connected to the reader of the time codes borne by the cine film, a first output connected to a stage controlling the supply of an electric motor ensuring advance of the cine film in the telecine apparatus, a second output connected to the coder and a third output connected to a first input of a comparator with two inputs of which the second input is connected to the head for reading the time codes on the magnetic tape, the output of the comparator is connected to a stage controlling supply of an electric motor of the servo-controlled magnetic tape recorder and the third output of the microcomputer is also connected to a device for recording time codes on the third track of the video tape.

BRIEF DESCRIPTION OF THE DRAWINGS

The invention will be more readily understood on reading the following description with reference to the accompanying drawings, in which:

FIG. 2 is a diagram illustrating the temporal distribution of the various signals recorded.

DESCRIPTION OF THE PREFERRED EMBODIMENT

Figure 1:
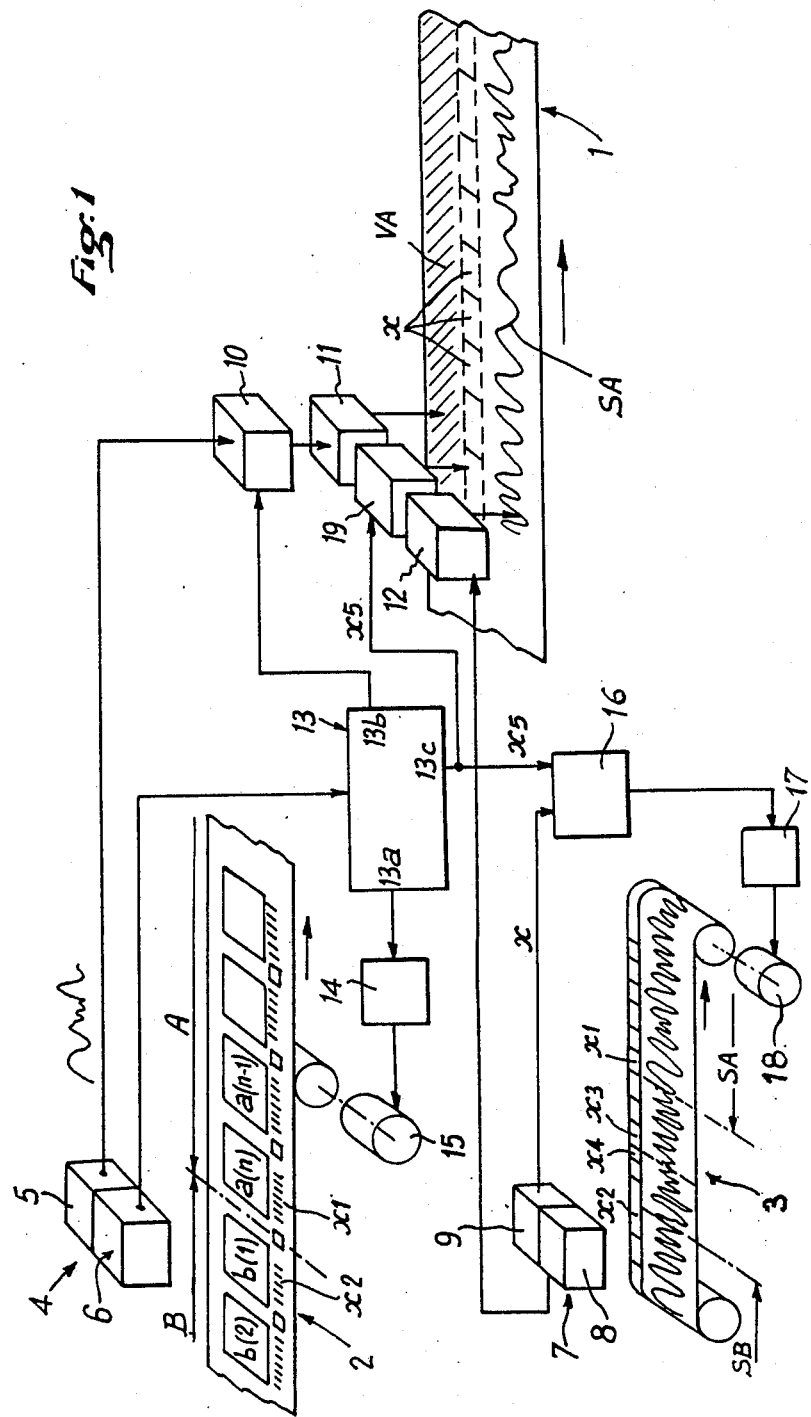
FIG. 1 is a block diagram of an apparatus for transferring images of a cine film and of the sound signal associated therewith, onto a common recording support according to the invention.

Referring now to the drawings, FIG. 1 illustrates an apparatus according to the invention for transferring onto a common recording support 1, such as a video tape, disc, etc., and in synchronism, on the one hand image sequences corresponding to successive shots recorded on a cinematographic film 2 and, on the other hand, corresponding sound sequences recorded on a separate magnetic tape 3 during a prior cine shot. By way of example, there are shown, recorded on the cine film 2, two successive shots A and B of which only the last images $a(n-1)$, $a(n)$ of the first shot A and the first images $b(1)$, $b(2)$ of the second shot B are shown. The shots A and B follow each other without interruption on the cine film 2 whilst, in fact, they were separated in time when they were made, by an appreciable interval of time during which the cine camera did not operate. During these cinematographic shots, there were also recorded, in the margin of the film 2, clear and/or in coded form, time information x indicating in particular the date and time of the shooting and the number or row of each image in the succession of images taken during each second. For example, the first shot A terminates by image $a(n)$ which was taken at a determined time of the day, for example 11 hours, 5 minutes, 10 seconds (11.05.10). This time is recorded clear and/or in coded form $x1$ in the marginal zone of the film, jointly with the number or row of the image in the second considered (from 1 to 24 if shooting takes place at 24 images/second). The following shot B then started at a subsequent instant for example at 11 hours 10 minutes, 25 seconds (11.1025), which is indicated by the recordal of the code $x2$ which is associated with the first image $b(1)$ of the second shot B.

Whilst the successive shots A, B, . . etc. are being made, the sound engineer's magnetic tape recorder is started in order to record, on the magnetic tape 3, the sound corresponding to the various shots A, B . . etc. To each shot A, B, . . thus corresponds the recording of a sound sequence SA,SB on the magnetic tape 2. At the same time, there is recorded on a special track of tape 3, a time code which indicates in particular the time at which the sound recording was made. The tape 3 consequently bears, on this special track, a time code $x1$ which indicates the time (11 hours, 5 minutes, 10 seconds) of the end of the sound sequence SA corresponding to the first shot A. On this track is also marked the time (11 hours, 10 minutes, 25 seconds), in the form of the time code $x2$, of the beginning of the sound sequence SB corresponding to the second shot B. However, due to the physical separation between the cine camera and the tape recorder, a gap exists on the track 3 between the end of the first sound sequence SA and the beginning of the second sound sequence SB. This is due to the fact that the magnetic tape 3 continues to advance a certain time after the cine camera has stopped, at the end of the first shot A, and that it is started a certain time before the beginning of the following shot B by the cine camera. The tape thus stops at a time $x3$ intermediate between $x1$ and $x2$, for example at 11 hours, 5 minutes, 15 seconds (11.05.15) in the example in question. In other words, the magnetic tape continues to advance for 5 seconds after the cine camera has stopped. The magnetic tape 3 is restarted some time before the cine camera is started and it restarts for example at a time $x4$ which is included between $x2$ and $x3$, for example at 11 hours, 10 minutes, 15 seconds (11.10.15), i.e. 10 seconds before effective start of the camera.

The transfer apparatus according to the invention comprises a telecine apparatus 4 ensuring reading of the cine film 2, this apparatus 4 comprising an image reader 5 and a reader 6 of the time codes $x1$, $x2$, etc., indicating the times of the shots. It also comprises a servo-controlled magnetic tape recorder 7 for reading the magnetic tape 3, which comprises a reading head 8 for reading the sound sequences SA,SB, etc., and another reading head 9 for reading the time codes $x1$, $x2$, etc., recorded on the magnetic tape 3 and defining the times of the sound recordings. The image reader 5 is connected to a coder 10 itself connected to a device 11 for recording video signals VA,VB, etc., which are recorded on the common support 1, constituted for example by a magnetic video tape, and which correspond respectively to shots A, B, etc.. The sound reading head 8 is itself connected to a device 12 for recording the successive sound sequences SA,SB, etc., on the video tape 1, in synchronism with the video sequences VA,VB, etc..

The reader 6 of codes $x1$, $x2$, etc., relative to the time of the shots, borne by the cine film 2, is connected to an input of a microcomputer 13 which is connected, by an output $13a$ to a stage 14 controlling supply of an electric motor 15 ensuring advance of the cine film 2 in the telecine apparatus. The microcomputer 13 is also connected, by a second output $13b$, to the coder 10. A third output $13c$ of the microcomputer 13 is connected to an input of a comparator 16 with two inputs of which the second input is connected to the head 9 for reading the time codes x on the magnetic tape 3. The output of the comparator 16 is connected to a stage 17 controlling supply of an electric motor 18 of the servocontrolled magnetic tape recorder 7. The output $13c$ of the microcomputer 13 is also connected to a device 19 for recording the time codes $x1$, $x2$, etc., on a special track of the video tape 1.

When, during reading of the images recorded on the cine film 2, the microcomputer 13 detects, via the code reader 6, a discontinuity between the time codes $x1$ and $x2$, this microcomputer 13 calculates, from the code $x2$ read from the cine film 2, a fictitious time $x5$ preceding the time $x2$ of the beginning of the second shot B. In the particular case taken by way of example hereinabove, the microcomputer 13 emits at its output $13c$ a signal $x5$ which indicates, for example, a calculated fictitious time equal to 11 hours, 10 minutes, 20 seconds (11.10.20). For this calculated time $x5$, any arbitrary value may be chosen, on condition that it is prior to $x2$. This choice is made under the control of the program controlling the microcomputer 13. The time code signal $x5$, corresponding to the calculated fictitious time, is applied both to the comparator 16 and to the device 19 which then repeatedly records this code $x5$ on the video tape 1. At the same time, the microcomputer 13 causes, by its output $13a$, the stop of the film 2 then its return rearwardly over a short distance so as to return the first image b1 of the second shot B into starting position. The emission of coded signal x5 also ensures start of the servo-controlled magnetic tape recorder 7 bearing the magnetic tape 3. During this time, the signal x5 is repeatedly recorded on the video tape 1 until the film 2 is again stopped after its return rearwardly. From that moment, this signal x5 is incremented and is successively recorded in this form, in other words, the video tape 1 bears increasing x codes (11.10.21;11.10.22;11.10.23;11.10.24;11.10.25). During the period of time during which the cine film 2 returns rearwardly then is stopped, the video tape 1 continues to advance, then recording a succession of identical images I (FIG. 2) corresponding, for example, to the appearance of a striated pattern on the screen of a monitor. To that end, the microcomputer 13 controls, by its output 13b, the coder 10 which is connected to the recording device 11 in order to record these striated pattern signals I on the video tape 1.

During all of this period of time, going from x5 (11.10.20) to x2 (11.10.25), the tape recorder 7 seeks its position of synchronism with respect to the fictitious time x5. In other words, it is subjected to a servo-control in speed and in position, by comparison of x codes read on the tape 3 by the reader 9 and applied to the second input of the comparator 16, and successive x codes x5 (11.10.20), x5 +1 (11.10.21), x5 +2 (11.10.22), etc... emitted by the microcomputer 13 and applied to the first input of the comparator 16. At time x2, i.e. x5 +5 seconds (11.10.25), in the example considered, the microcomputer 13 starts up the telecine apparatus 14 and the sound tape 3 is consequently, at that moment, in perfect synchronism with the film 2 which has just started.

It may be seen from the foregoing description that the transfer apparatus according to the invention makes it possible to obtain an automatic setting of the sound registration with respect to the video signals recorded on a common recording support. Furthermore, another advantage of this apparatus is that, due to the creation, on the video tape, of an interval or a "dead zone" between two recorded video signals VA and VB, rapid access may be obtained, by using the time codes x recorded on the special track of the video tape provided to that end, to particular video signals forming part of a desired sequence of shots.

Furthermore, it should be noted that, although the description describes, by way of illustration, the use, as common recording support, of a video tape, it is possible to use the apparatus according to the invention with any support, for example a disc.

What I claim is:

1. A process of transfer in synchronism, onto a common recording support of the images of a cinematographic film and of the sound recorded during shooting on a separate support, with a recording in synchronism respectively on the cine film and the sound recording support, of time code indicating periodically the effective time at which the film was shot, in which there are recorded on a first track of the common recording support successive video signals corresponding to the successive shots; on a second track of the common recording support, successive sound sequences corresponding to these shots and, on a third track, time codes, comprising the steps consisting in detecting, on the cine film, every discontinuity between a first time code corresponding to the end of a first shot and a second time code corresponding to the beginning of a second shot recorded on the film immediately after the preceding one, returning following such detection, said cine film rearwardly and stopping it in the position corresponding to the separation between the two successive shots, simultaneously calculating a third time code corresponding to a fictitious time prior to the time of the beginning of the second shot from the second time code, repeatedly recording this third time code on the third track of the common recording support following the first time code corresponding to the end of the first shot and then recording, immediately after the moment when the cine film has been stopped, time codes incremented regularly from the value of the third time code, recording a succession of signals corresponding to identical images, such as a striated pattern, on the common recording support during the period of time during which the cine film returns rearwardly and is maintained stopped, setting, during this period of time, the sound recording support, in position and speed, on the fictitious time defined by the third time code, and restarting the cine film upon detection of the second time code so that the sound recording support is then in perfect synchronism with the film having just started.

2. An apparatus for transferring in synchronism, onto a common recording support, the images of a cinematographic film and the sound recorded during shooting on a separate support, comprising a telecine apparatus ensuring reading of the cine film, this apparatus comprising an image reader and a reader of time codes indicating the shooting times, a servo-controlled magnetic tape recorder for reading a magnetic tape for sound recording, which comprises a reading head for reading the sound sequences, and another reading head for reading the time codes recorded on the magnetic tape and defining the times of the sound recordings, the image reader being connected to a coder itself connected to a device for recording video signals which are recorded on the common support constituted for example by a magnetic video tape, and which correspond respectively to the shots, the sound reading head itself being connected to a device for recording the successive sound sequences on the video tape in synchronism with the video sequences, comprising a microcomputer having an input connected to the reader of the time codes borne by the cine film, a first output connected to a stage controlling the supply of an electric motor ensuring advance of the cine film in the telecine apparatus, a second output connected to the coder and a third output connected to a first input of a comparator with two inputs of which the second input is connected to the head for reading the time codes on the magnetic tape, the output of the comparator is connected to a stage controlling supply of an electric motor of the servo-controlled magnetic tape recorder and the third output of the microcomputer is also connected to a device for recording time codes on the third track of the video tape.

* * * * *